(12) United States Patent
Mei et al.

(10) Patent No.: US 9,873,754 B2
(45) Date of Patent: Jan. 23, 2018

(54) PROCESS FOR THE GAS-PHASE POLYMERIZATION OF ETHYLENE OR ETHYLENE MIXTURES

(71) Applicant: Basell Polyolefine GmbH, Wesseling (DE)

(72) Inventors: Gabriele Mei, Ferrara (IT); Pietro Baita, Ferrara (IT); Lorella Marturano, Ferrara (IT); Antonio Mazzucco, Ferrara (IT); Roberta Pica, Ferrara (IT); Gerhardus Meier, Frankfurt/M (DE); Ulf Schueller, Frankfurt/M (DE)

(73) Assignee: Basell Polyolefine GmbH, Wesseling (DE)

( * ) Notice: Subject to any disclaimer, the term of this patent is extended or adjusted under 35 U.S.C. 154(b) by 116 days.

(21) Appl. No.: 14/891,506

(22) PCT Filed: May 13, 2014

(86) PCT No.: PCT/EP2014/059685
§ 371 (c)(1),
(2) Date: Nov. 16, 2015

(87) PCT Pub. No.: WO2014/184155
PCT Pub. Date: Nov. 20, 2014

(65) Prior Publication Data
US 2016/0108148 A1 Apr. 21, 2016

(30) Foreign Application Priority Data
May 16, 2013 (EP) .................................... 13168137

(51) Int. Cl.
*C08F 2/01* (2006.01)
*C08F 4/646* (2006.01)
(Continued)

(52) U.S. Cl.
CPC ............ *C08F 110/02* (2013.01); *C08F 2/001* (2013.01); *C08F 2/002* (2013.01); *C08F 10/02* (2013.01);
(Continued)

(58) Field of Classification Search
CPC ........ C08F 2/002; C08F 4/654; C08F 4/6543; C08F 4/655; C08F 4/6565; C08F 4/6567; C08F 110/02; C08F 210/02; C08F 2/001
See application file for complete search history.

(56) References Cited

U.S. PATENT DOCUMENTS

| 5,728,353 A | 3/1998 | Govoni et al. |
| 2004/0116631 A1 | 6/2004 | Sacchetti et al. |

(Continued)

FOREIGN PATENT DOCUMENTS

| CN | 1143651 A | 2/1997 |
| EP | 0574821 A2 | 12/1993 |

(Continued)

OTHER PUBLICATIONS

PCT International Search Report & Written Opinion dated Aug. 29, 2014 for PCT/EP2014/059685.

*Primary Examiner* — Caixia Lu

(57) ABSTRACT

A process for the gas-phase polymerization of ethylene or a mixture of ethylene and one or more 1 olefins in the presence of a polymerization catalyst system comprising the steps
a) feeding a solid catalyst component, which was obtained by contacting at least a magnesium compound and a titanium compound, to a continuously operated apparatus and contacting the solid catalyst component with an aluminum alkyl compound at a temperature of from 0° C. to 70° C. in a way that the mean residence time of the solid catalyst component in contact with the aluminum alkyl compound is from 5 to 300 minutes;

(Continued)

b) transferring the catalyst component formed in step a) into another continuously operated apparatus and prepolymerizing it with ethylene or a mixture of ethylene and one or more 1 olefins in suspension at a temperature of from 10° C. to 80° forming polymer in an amount of from 0.2 to 25 g polymer/g of solid catalyst component in a way that the mean residence time of the solid catalyst component in the apparatus is from 5 minutes to 3 hours; and c) transferring the prepolymerized catalyst component formed in step b) into a gas-phase polymerization reactor and polymerizing ethylene or a mixture of ethylene and one or more 1 olefins in the presence of the prepolymerized catalyst component at temperatures of from 40° C. to 120° C. and pressures of from 0.1 to 10 MPa.

12 Claims, 1 Drawing Sheet

(51) Int. Cl.
*C08F 110/02* (2006.01)
*C08F 2/00* (2006.01)
*C08F 10/02* (2006.01)
*C08F 4/655* (2006.01)
*C08F 4/654* (2006.01)
*C08F 4/656* (2006.01)

(52) U.S. Cl.
CPC .............. *C08F 4/654* (2013.01); *C08F 4/655* (2013.01); *C08F 4/6543* (2013.01); *C08F 4/6548* (2013.01); *C08F 4/6565* (2013.01)

(56) References Cited

U.S. PATENT DOCUMENTS

2008/0312388 A1 12/2008 Mei et al.
2009/0156758 A1 6/2009 Pater et al.
2011/0282013 A1 11/2011 Baita et al.

FOREIGN PATENT DOCUMENTS

| WO | WO02074818 A1 | 9/2002 |
| WO | WO2006040240 A1 | 4/2006 |
| WO | WO2007033941 A1 | 3/2007 |
| WO | WO2010076289 A1 | 7/2010 |

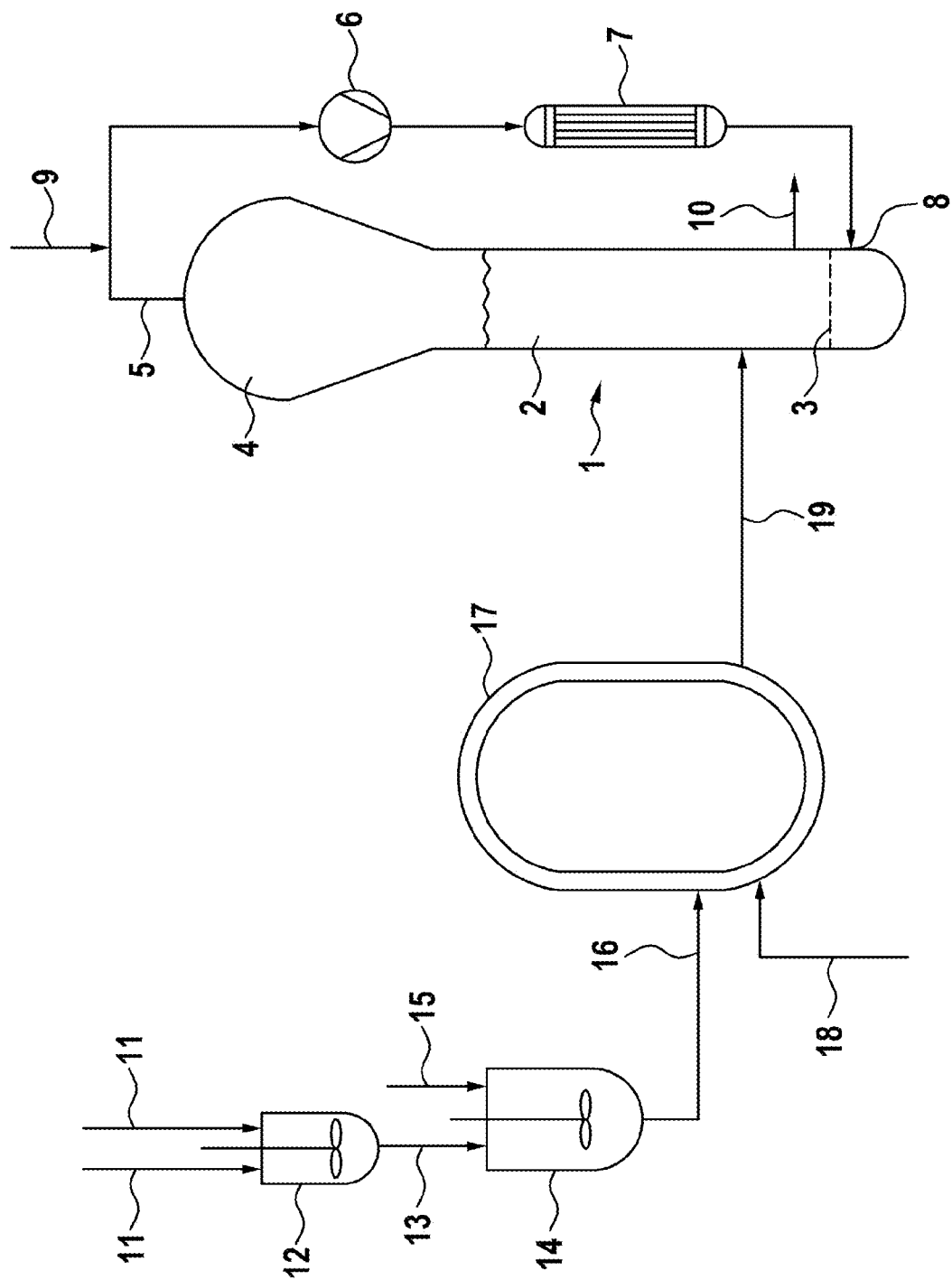

PROCESS FOR THE GAS-PHASE POLYMERIZATION OF ETHYLENE OR ETHYLENE MIXTURES

This application is the U.S. National Phase of PCT International Application PCT/EP2014/059685, filed May 13, 2014, claiming benefit of priority to European Patent Application No. 13168137.1, filed May 16, 2013, the disclosures of which are incorporated herein by reference in their entirety.

FIELD OF THE INVENTION

The present technology relates to a process for the gas-phase polymerization of ethylene or a mixture of ethylene and one or more 1-olefins in the presence of a polymerization catalyst system.

BACKGROUND OF THE INVENTION

Gas-phase polymerization processes are economical processes for producing polyethylenes. Such processes can, in particular, be carried out in gas-phase fluidized-bed reactors, in which the polymer particles are kept in a fluidized state by means of an appropriate gas stream. However, to allow a stable production of polyethylenes with constant product quality it may be necessary to carry out the polymerization in a way that local overheating in catalyst particles, so-called hot spots, and sheeting at the reactor walls are avoided because such phenomena may result in the formation of lumps or agglomerates. However, the formation of lumps or agglomerates is highly undesirable because the quality of the prepared polymers may be reduced and plugging of the product discharge system with a subsequently required shut-down of the polymerization process may occur.

One possibility to improve the operability of gas-phase polymerization reactors, i.e. to reduce the tendency for forming such lumps or agglomerates, is the manner of how the catalyst is fed into the polymerization reactor and how it is pretreated before being fed. Many possibilities have been described. WO 2010/076289 A1, for example, discloses a process for introducing a catalyst powder based on a titanium compound supported on magnesium halide into a gas-phase olefin polymerization reactor in which the catalyst powder is first contacted with a liquid phase comprising an organo-aluminum compound and optionally an external donor compound and then the activated catalyst powder is introduced in a gas-phase olefin polymerization reactor. However, the operability of the process may still be unsatisfactory for some polymerization conditions.

It has been found that the operability of polymerization processes can be improved if a prepolymerized catalyst is fed to the polymerization reaction. The prepolymerization can be carried out in the course of preparing the polymerization catalyst or immediately thereafter. However, this means that higher amounts of catalysts, in terms of solid powder, have to be processed because prepolymerization increases the mass of the catalyst and may necessitate that activated catalysts have to be stored and transported. Consequently, performing the prepolymerization immediately before introducing the catalyst into the polymerization reactor may be necessary.

EP 560 312 A1 describes a continuous process for the gas-phase polymerization of ethylene and its mixtures with α-olefins, in which the product resulting from contacting a titanium halide supported on an active magnesium dihalide and an aluminum alkyl compound, optionally in the presence of polymerizable olefin, is prepolymerized with ethylene or an ethylene α-olefin mixture in an amount of 30 to 1000 g/g of solid catalyst component and the polymerization of ethylene or its mixtures with α-olefins is carried out in gas-phase in the presence of an alkane having from 3 to 5 carbon atoms using the resulting prepolymerized catalyst system. The steps of preforming and of prepolymerizing the catalyst and the presence of the alkane in the gas phase make it possible to easily control the gas-phase polymerization process. One drawback for such a process is the walls of the prepolymerization reactor may be coated with the polymeric material and a shut-down of the polymerization may be necessary for recovery of the material. Furthermore, the polyethylene products sometimes contain inhomogeneities like specks and, particularly in large commercial plants, the requisite amount of first prepared pre-polymer may necessitate that relatively large equipment be installed ahead of the first gas phase reactor.

Alternative possibilities for carrying out a prepolymerization immediately before entering the catalyst into the polymerization reactor have been investigated. For example, WO 2007/033941 A1 discloses a process for the gas-phase polymerization of olefins in which the polymerization catalyst is prepolymerized with one or more olefins in a gas-phase tubular reactor before being fed to the gas-phase polymerization reactor. However, the gas-phase tubular reactor for carrying out the prepolymerization was very sensitive with respect to its operability. Accordingly it was the object of the present technology to overcome the challenges in the relevant technical field and to find a gas-phase polymerization processes for producing polyethylenes that avoids wall sheeting in the prepolymerization reactor and prevents the formation of lumps or agglomerates in the polymerization reactors, resulting in polyethylene particles having good particle size distribution with a reduced formation of fine polyethylene particles, polyethylenes with a good homogeneity and not requiring large-dimensioned apparatuses for the prepolymerization.

SUMMARY OF THE INVENTION

The present technology relates to a process for the gas-phase polymerization of ethylene or a mixture of ethylene and one or more 1-olefins in the presence of a polymerization catalyst system comprising the steps of: a) feeding a solid catalyst component, which was obtained by contacting at least a magnesium compound and a titanium compound, to a continuously operated apparatus and contacting the solid catalyst component with an aluminum alkyl compound at a temperature of from 0° C. to 70° C. in a way that the mean residence time of the solid catalyst component in contact with the aluminum alkyl compound is from 5 to 300 minutes; b) transferring the catalyst component formed in step a) into another continuously operated apparatus and prepolymerizing it with ethylene or a mixture of ethylene and one or more 1-olefins in suspension at a temperature of from 10° C. to 80° forming polymer in an amount of from 1 to 25 g polymer/g of solid catalyst component in a way that the mean residence time of the solid catalyst component in the apparatus is from 5 minutes to 3 hours; and c) transferring the prepolymerized catalyst component formed in step b) into a gas-phase polymerization reactor and polymerizing ethylene or a mixture of ethylene and one or more 1-olefins in the presence of the prepolymerized catalyst component at temperatures of from 40° C. to 120° C. and pressures of from 0.1 to 10 MPa.

BRIEF DESCRIPTION OF THE DRAWINGS

The features and benefits of the present technology can be better understood via the following description and the accompanying drawing.

FIG. 1 shows a polymerization system schematic for treating the obtained polyolefin particles and performing additional processes in accordance with some embodiments of the present technology.

DETAILED DESCRIPTION OF THE INVENTION

The present technology provides a process for the gas-phase polymerization of ethylene or a mixture of ethylene and one or more 1-olefins in the presence of a polymerization catalyst system. Olefins for use in the present technology include 1-olefins, i.e. hydrocarbons having terminal double bonds. Olefins monomers may also include functionalized olefinically unsaturated compounds, including linear or branched $C_3$-$C_{12}$-1-alkenes such as linear $C_3$-$C_{10}$-1-alkenes including propylene, 1-butene, 1-pentene, 1-hexene, 1-heptene, 1-octene and 1-decene, or branched $C_2$-$C_{10}$-1-alkenes such as 4-methyl-1-pentene or conjugated and non-conjugated dienes such as 1,3-butadiene, 1,4-hexadiene or 1,7-octadiene. Olefins for use in the present technology may further include ones in which the double bond is part of a cyclic structure which can have one or more ring systems. Examples of such olefins include cyclopentene, norbornene, tetracyclododecene or methylnorbornene or dienes such as 5-ethylidene-2-norbornene, norbornadiene or ethylnorbornadiene. It is also possible to polymerize mixtures of two or more olefins in accordance with some embodiments of the present invention.

The processes described herein may be used for the homopolymerization or copolymerization of ethylene. Comonomers for use in such processes may comprise a concentration of up to 20 wt. %, including from 0.01 wt. % to 15 wt. % and from 0.05 wt. % to 12 wt. % of $C_3$-$C_8$-1-alkenes such as 1-butene, 1-pentene, 1-hexene and/or 1-octene. In addition, a process in which ethylene is copolymerized with from 0.1 wt.-% to 12 wt.-% of 1-hexene and/or 1-butene accords with certain embodiments of the present technology.

Gas-phase polymerization processes are processes in which solid polymers are obtained from a gas-phase comprising the monomer or the monomers. These processes may be carried out by feeding solid catalyst particles into a gas-phase polymerization reactor and polymer grows on these particles. The resulting polyethylene particles have a more or less regular morphology and size, which depends on the catalyst morphology and size and on polymerization conditions. The mean particle diameter of the obtained polyethylene particles may reside in a range of from about 500 to about 3000 µm in accordance with certain embodiments of the present technology.

In accordance with some embodiments of the present technology, in step a) of the gas-phase polymerization process a solid catalyst component, which was obtained by contacting at least a magnesium compound and a titanium compound, may be fed to a continuously operated apparatus and contacted therein with an aluminum alkyl compound. In the preparation of the solid catalyst component, at least one compound of magnesium may be used. Compounds of this type may comprise magnesium halides such as magnesium chlorides and magnesium bromides, from which the magnesium halides can be obtained in a customary way, e.g. by reaction with halogenating agents. For the present purposes, halogens are chlorine, bromine, iodine or fluorine or mixtures of two or more halogens. Magnesium compounds from which the halides can be obtained are, for example, magnesium alkyls, magnesium aryls, magnesium alkoxy compounds or magnesium aryloxy compounds or Grignard compounds. Halogenating agents may include, for example, halogens, hydrogen halides, $SiCl_4$ or $CCl_4$ and chlorine or hydrogen chloride.

Examples of halogen-free compounds of magnesium for use in the present technology include diethylmagnesium, di-n-propylmagnesium, diisopropylmagnesium, di-n-butylmagnesium, di-sec-butylmagnesium, di-tert-butylmagnesium, diamylmagnesium, nbutylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium.

Examples of Grignard compounds for use in the present technology include methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide. Magnesium compounds for producing the particulate solids of the present technology may include di($C_1$-$C_{10}$-alkyl)magnesium compounds.

Titanium compounds for use in the present technology may include halides or alkoxides of trivalent or tetravalent titanium, with titanium alkoxy halogen compounds or mixtures of various titanium compounds also being possible. Examples of titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)C_{13}$, $Ti(OC_2H_5)Br_3$, $Ti(O\text{-}n\text{-}C_4H_9)Br_3$, $Ti(OCH_3)_2Cl_2$, $Ti(OC_2H_5)_2C_{12}$, $Ti(O\text{-}n\text{-}C_4H_9)_2C_{12}$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3 Br$, $Ti(OCH_3)_4$, $Ti(OC_2H_5)_4$ or $Ti(O\text{-}n\text{-}C_4H_9)_4$. Titanium halides for use in the present technology may include those compounds which comprise only halogen, such as titanium chlorides including titanium tetrachloride. Vanadium compounds for use in the present technology may include vanadium halides, vanadium oxyhalides, vanadium alkoxides and the vanadium acetylacetonates. Vanadium compounds in the oxidation states 3 to 5 may be utilized in accordance with certain embodiments of the present technology.

A solid catalyst component of the present technology may be obtained by contacting a magnesium compound and a titanium compound but also an electron donor compound. Such internal electron donor compounds for preparing the solid catalyst component may be selected from the group consisting of alcohols, glycols, esters, ketones, amines, amides, nitriles, alkoxysilanes and aliphatic ethers. These electron donor compounds can be used alone or in mixtures with other electron donor compounds.

Alcohols for use in the present technology include those of formula $R^1OH$, in which the $R^1$ group is a $C_1$-$C_{20}$ hydrocarbon group, including those where $R^1$ is a $C_1$-$C_{10}$ alkyl group. Specific examples are methanol, ethanol, isopropanol and n-butanol. Glycols for use in the present technology include those having a total number of carbon atoms lower than 50, including the 1,2 or 1,3 glycols having a total number of carbon atoms lower than 25. Specific examples are ethylenglycol, 1,2-propylenglycol and 1,3-propylenglycol. Esters for use in the present technology include $C_1$-$C_{20}$ aliphatic carboxylic acids such as $C_1$-$C_8$ alkyl esters of aliphatic mono carboxylic acids including ethylacetate, methylformiate, ethylformiate, methylacetate, propylacetate, i-propylacetate, n-butylacetate, i-butylacetate. Amines for use in the present technology include those of formula $NR^2_3$ in which the $R^2$ groups are, independently, hydrogen or a $C_1$-$C_{20}$ hydrocarbon group where the groups are not simultaneously hydrogen, including amines where $R^2$ is a $C_1$-$C_{10}$ alkyl group such as diethylamine, diisopropylamine and triethylamine Amides may include those of the general formula $R^3CONR^4_2$, in which $R^3$ and $R^4$ are, independently, hydrogen or a $C_1$-$C_{20}$ hydrocarbon group. Specific examples are formamide and acetamide. Nitriles for use in the present technology include those of the general formula $R^1CN$, where the $R^1$ group is a $C_1$-$C_{20}$ hydrocarbon group, including those where $R^1$ is a $C_1$-$C_{10}$ alkyl group. A specific example is acetonitrile. Alkoxysilanes for use in the present technology include those of formula $R^5_a R^6_b Si(OR^7)_c$, where a and b are integer from 0 to 2, c is an integer from 1 to 4 and the sum (a+b+c) is 4; $R^5$, $R^6$, and $R^7$, are alkyl, cycloalkyl or aryl radicals with 1-18 carbon atoms optionally containing heteroatoms, including silicon compounds in which a is 0 or 1, c is 2 or 3, $R^6$ is an alkyl or cycloalkyl group, optionally containing heteroatoms, and $R^7$ is methyl. Silicon compounds for use in the present technology may include methyltrimethoxysilane, dimethyldimethoxysilane, trimethylmethoxysilane and t-butyltrimethoxysilane.

For obtaining the solid catalyst component, in certain embodiments the magnesium compound and the titanium are first contacted, optionally in the presence of an inert medium, in order to prepare an intermediate product containing a titanium comcompound supported on a magnesium halide that may be isolated. Subsequently, the internal electron donor compound is contacted with this intermediate product, whereby it may be added to the reaction mixture alone or in a mixture with other compounds. The reaction product can then be subjected to washing with proper solvents in order to recover a final solid catalyst component. The treatment with the electron donor compound may optionally be repeated one or more times. In certain embodiments, the solid catalyst component of the present technology further may comprise a particulate inorganic oxide as support, including but not limited to silica gel, aluminum oxide or aluminosilicates.

In accordance with some embodiments of the present technology, the solid catalyst component may be contacted in step a) with an aluminum alkyl compound. The aluminum alkyl compound may be a trialkylaluminum compound such as trimethylaluminum, triethylaluminum, triisobutylaluminum, tri-n-butylaluminum, tri-nhexylaluminum, or tri-n-octylaluminum. Alkylaluminum halides, alkylaluminum hydrides and alkylaluminum chlorides such as diethylaluminum chloride, diisobutylaluminum chloride, alkylaluminum sesquichloride like $AlEt_2Cl$ or $Al_2Et_3Cl_3$ and dimethylaluminum chloride may also be used. It is also possible to use mixtures of aluminum alkyl compounds, for example, mixtures of a trialkylaluminum and an alkylaluminum halide including triethylaluminum/diethylaluminum chloride or triisobutylaluminum/diethylaluminum chloride.

The solid catalyst component and the aluminum alkyl compound may contact one another at a temperature of from 0° C. to 70° C., including from 25° C. to 65° C. and from 40° C. to 60° C. The mean residence time of the solid catalyst component in contact with the aluminum alkyl compound may be from 5 to 300 minutes, including from 50 to 200 minutes and in particular of from 60 to 100 minutes. The contacting of the solid catalyst component and the aluminum alkyl compound may be carried out with the solid catalyst component being suspended in a diluent such as an inert liquid hydrocarbon including propane, n-hexane or n-heptane. In some embodiments of the present technology, the contacting of the solid catalyst component with an aluminum alkyl compound is carried out in the presence of an external electron donor compound. External electron donor compounds may include compounds selected from the group consisting of alcohols, glycols, esters, ketones, amines, amides, nitriles, alkoxysilanes and aliphatic ethers.

The contacting of the solid catalyst component, the aluminum alkyl compound and, if present, the external electron donor may be carried out in a continuously operated apparatus. Continuously operated apparatuses for use in the present technology may include continuous stirred tank reactors (CSTR) or loop reactors for contacting the solid catalyst component and the aluminum alkyl compound. It is also possible to carry out the contacting of step a) in two, three or more subsequent continuously operated apparatuses. In such a case the sum of the mean residence times of the solid catalyst component in contact with the aluminum alkyl compound in the apparatuses used for the contacting of step a) is, in some embodiments, from 5 to 300 minutes. The contacting of the solid catalyst component with an aluminum alkyl compound may be carried out in a series of two continuously operated apparatuses and the sum of the mean residence time of the solid catalyst component in contact with the aluminum alkyl compound in the first apparatus and the mean residence time of the solid catalyst component in contact with the aluminum alkyl compound in the second apparatus may occur in a time range of from 5 to 300 minutes. If two subsequent apparatuses are used for contacting the solid catalyst component and the aluminum alkyl compound, both apparatuses may be continuous stirred tank reactors or, alternatively, the first continuously operated apparatus may be a continuous stirred tank reactor and the second apparatus may be a loop reactor.

Step b) of the process of the present technology encompasses transferring the catalyst component formed by contacting the solid catalyst component, the aluminum alkyl compound and, if present, the external electron donor into a further continuously operated apparatus and prepolymerizing it with ethylene or a mixture of ethylene and one or more 1-olefins in suspension at a temperature of from 10° C. to 80° C., including from 20° C. to 70° C. and from 40° C. to 60° C. The mean residence time of the solid catalyst component in the apparatus may be in a time range of from 5 minutes to 3 hours, including from 20 to 80 minutes and from 30 to 60 minutes. The prepolymerization may be carried out in an inert liquid hydrocarbon as diluent, such as propane, n-hexane or n-heptane. In some embodiments, the prepolymerization is carried out in the presence of hydrogen.

The amount of the formed polymer in the prepolymerization step is from 0.2 gram (g) to 25 g of polymer per g of solid catalyst component, including from 1 g to 20 g of polymer per g of solid catalyst component. The final catalyst yield can be determined by the analysis of the catalyst residues, for instance, from the titanium and/or magnesium content or from the balance of the materials.

Continuously operated apparatuses for carrying out the prepolymerization may include continuous stirred tank reactors (CSTR) or loop reactors. It is further also possible to carry out the prepolymerization of step b) in two or more subsequent continuously operated apparatuses. In such a case the combined mean residence time of the solid catalyst component in the apparatuses used for prepolymerizing is in a time range of from 5 minutes to 3 hours. If more than one apparatus is used for prepolymerizing the solid catalyst component, the prepolymerization may be carried out in two subsequent apparatuses. In some embodiments, both apparatuses are loop reactors or, alternatively, the first continuously operated apparatus is a continuous stirred tank reactor and the second one is a loop reactor. In such a case the amount of the formed pre-polymer in the first apparatus may be in a range of from 0.2 g to 5 g of polymer per g of solid catalyst component, including from 0.5 g to 2 g of polymer per g of solid catalyst component. The amount of the formed pre-polymer in the second apparatus may be in a range of from 2 g to 15 g of polymer per g of solid catalyst component, including from 8 g to 12 g of polymer per g of solid catalyst component.

The prepolymerized solid catalyst components are transferred in step c) of the process of the present technology into a gas-phase polymerization reactor and ethylene or a mixture of ethylene and one or more 1-olefins is polymerized into the reactor in the presence of the prepolymerized catalyst component at a temperature of from 40° C. to 120° C., including from 60° C. to 90° C. and from 65° C. to 85° C., and a pressure of from 0.1 to 10 MPa, including from 1 to 5 MPa and in particular from 1.5 to 3.5 MPa. Reactors for carrying out gas-phase polymerizations are, for example, stirred gas-phase reactors, multizone gas-phase reactors, or gas-phase fluidized-bed reactors. Stirred gas-phase reactors may be horizontally or vertically stirred.

Reactors for use in the present technology include fluidized-bed reactors, i.e. reactors comprising a bed of polymerizing polymer particles which are kept in a fluidized state by introducing a gas stream from below the bed. This gas may be taken off at the upper end of the reactor, cooled to remove the heat of polymerization and recirculated back into the reactor at its lower end. The circulated reaction gas, in some embodiments, may include a mixture of the olefins to be polymerized, such as a $C_3$-$C_5$ alkane as a polymerization diluent and optionally other inert gases like nitrogen or additional alkanes and/or a molecular weight regulator such as hydrogen. The polymerization can also be carried out in a condensing or super-condensing mode, in which part of the circulating gas is cooled to below the dew point and returned to the reactor separately as a liquid and a gas phase or together as a two-phase mixture in order to make additional use of the enthalpy of vaporization for cooling the reaction gas.

Reactors may further include multizone circulating reactors which are, for example, described in WO 97/04015 and WO 00/02929 and have two interconnected polymerization zones, a riser, in which the growing polymer particles flow upward under fast fluidization or transport conditions and a downcomer, in which the growing polymer particles flow in a densified form under the action of gravity. The polymer particles leaving the riser enter the downcomer riser and the polymer particles leaving the downcomer are reintroduced into the riser, thus establishing a circulation of polymer particles between the two polymerization zones, where the polymer may be passed a plurality of times through these two zones. It is also possible to operate the two polymerization zones of one multizone circulating reactor with different polymerization conditions by establishing different polymerization conditions in its riser and its downcomer. For this purpose, the gas mixture leaving the riser and entraining the polymer particles can be partially or totally prevented from entering the downcomer. This process may be achieved by feeding a barrier fluid in form of a gas and/or a liquid mixture into the downcomer, such as in the upper part of the downcomer.

The barrier fluid should have a composition differing from that of the gas mixture present in the riser. The amount of added barrier fluid can be adjusted in a way that an upward flow of gas countercurrent to the flow of the polymer particles is generated, particularly at the top, thereby acting as a barrier to the gas mixture entrained among the particles coming from the riser. In this manner it is possible to obtain two different gas composition zones in one multizone circulating reactor. Furthermore it is also possible to introduce make-up monomers, comonomers and/or molecular weight regulators such as hydrogen and/or inert fluids at any point of the downcomer, such as below the barrier feeding point. It is further possible to create varying monomer, comonomer and hydrogen concentrations along the downcomer resulting in a further differentiation of the polymerization conditions.

In some embodiments of the present technology, the gas-phase polymerization reactor, into which the prepolymerized catalyst component is transferred, is a fluidized-bed reactor. This fluidized-bed reactor can be a single reactor, in which the complete polymerization of ethylene or the mixture of ethylene and one or more 1-olefins is carried out, or it can be the first reactor of a series of two or more gas-phase polymerization reactors. If the fluidized-bed reactor is the first reactor of a series of gas-phase reactors the polymerization downstream of the fluidized-bed reactor may, in some embodiments, be carried out in one or more fluidized-bed reactors or in a multizone circulating reactor, in which the growing polymer particles flow upward through a first polymerization zone under fast fluidization or transport conditions, leave said first polymerization zone and enter a second polymerization zone through which the polymer particles flow downward under the action of gravity, leave said downcomer and are reintroduced into the riser, thus establishing a circulation of polymer.

FIG. 1 shows schematically the set-up of a gas-phase polymerization reactor for carrying out the process of the present technology, in which the reactor is a fluidized-bed reactor (1), which comprises a fluidized bed (2) of polyethylene particles, a gas distribution grid (3) and a velocity reduction zone (4). The velocity reduction zone (4) may comprise an increased diameter compared to the diameter of the fluidized-bed portion of the reactor. The polyethylene bed is kept in a fluidization state by an upwardly flow of gas fed through the gas distribution grid (3) placed at the bottom portion of the reactor (1). The gaseous stream of the reaction gas leaving the top of the velocity reduction zone (4) via a recycle line (5) is compressed by a compressor (6), transferred to a heat exchanger (7), in which it is cooled, and then recycled to the bottom of the fluidized-bed reactor (1) at a point below the gas distribution grid (3) at position (8). The recycle gas can, if appropriate, be cooled to below the dew point of one or more of the recycle gas components in the heat exchanger so as to operate the reactor with condensed material, i.e. in the condensing mode. The recycle gas can comprise, besides unreacted monomers, also inert condensable gases, such as alkanes, as well as inert non-condensable gases, such as nitrogen. Make-up monomers, molecular weight regulators, and optional inert gases can be fed into the reactor (1) at various positions, for example via line (9) upstream of the compressor (6); this non-limiting the scope of the technology. The polyethylene particles obtained in the fluidized-bed reactor (1) are discontinuously discharged via a discharge line (10).

For preparing the polymerization catalyst system utilized in the polymerization process of the present technology, a solid catalyst component, which was obtained by contacting a magnesium compound, a titanium compound; and an internal electron donor compound selected from the group consisting of alcohols, glycols, esters, ketones, amines, amides, nitriles, alkoxysilanes and aliphatic ethers, an aluminum alkyl compound, and optionally an external electron donor compound are fed together with a liquid diluent, such as propane, via one or more lines (11) to a first continuously operated stirred tank (12), in which the components are contacted at a temperature of from 25° C. to 70° C. The content of stirred tank (12) is transferred via line (13) to a second continuously operated stirred tank (14). It is further possible to add further components such as for example additional propane, via one or more lines (15) to the second stirred tank (14). It is however also possible to introduce additionally ethylene or the mixture of ethylene and one or more 1-olefins into the second stirred tank (14) for carrying out a first prepolymerization.

The content of the second stirred tank (14) is transferred via a line (16) to a loop prepolymerization reactor (17) for carrying out a prepolymerization of the pre-activated the catalyst component or, if a first prepolymerization has already been carried out in the second stirred tank (14), for continuing with the prepolymerization. The prepolymerization reactor (17) may be operated at a temperature of from 0° C. to 80° C. The ethylene or the mixture of ethylene and one or more 1-olefins is introduced into the prepolymerization reactor (17) via one or more lines (18). The prepolymerized catalyst component is then transferred to fluidized-bed reactor (1) via a line (19).

EXAMPLES

The density of the obtained polyethylenes was determined according to DIN EN ISO 1183-1:2004, Method A (Immersion) with compression molded plaques of 2 mm thickness. The compression molded plaques were prepared with a defined thermal history: Pressed at 180° C., 20 MPa for 8 min with subsequent crystallization in boiling water for 30 min. The melt flow rate $MFR_{2.16}$ was determined according to DIN EN ISO 1133:2005, condition D at a temperature of 190° C. under a load of 2.16 kg. The particle size distribution was determined through the use of a Tyler Testing Sieve Shaker RX-29 Model B available from Combustion Engineering Endecott provided with a set of twelve sieves, according to ASTM E-11-87, of 106, 125, 180, 300, 500, 710, 1000, 1400, 2000, 2800, 3350, and 4000 μm. The poured bulk density (PBD) was determined according to DIN EN ISO 60:2000-01.

Example 1

The preparation of a high density polyethylene (HDPE) was carried out in a fluidized-bed reactor as shown in FIG. 1. The solid catalyst component of the polymerization catalyst was prepared with the procedure described in WO 2004/106388 A2, Example 1 by reacting a magnesium dichloride support with an average particle size of 45 μm and titanium tetrachloride with ethyl acetate as internal electron donor compound. The solid catalyst component was introduced into stirred tank (12) at a rate of 20 g/h solid catalyst component using 1.5 kg/h of liquid propane. Furthermore, a mixture of triisobutylaluminum (TIBAL) and diethyl aluminum chloride (DEAC) in a weight ratio of 7:1 as aluminum alkyl compound and tetrahydrofuran (THF) as external electron donor compound were dosed into the first precontacting apparatus. The weight ratio of dosed TIBAL/DEAC mixture to the dosed solid catalyst component was 10:1. The weight ratio of dosed TIBAL/DEAC mixture dosed THF was 70. The apparatus was kept at 50° C. operated in a way that the mean residence time of the solid catalyst component in the stirred tank was 135 minutes.

The catalyst suspension discharged from stirred tank (12) was bypassed stirred tank (14) and continuously transferred to loop reactor (17) for prepolymerizing with ethylene in the presence of hydrogen as molecular weight regulator. The prepolymerization reactor was operated at 55° C. with an average residence time of 171 minutes. The molar ratio of dosed hydrogen to dosed ethylene was 0.2. Ethylene was dosed in an amount of 15 g ethylene/g of solid catalyst component. The catalyst suspension discharged from loop reactor (17) was continuously transferred to fluidized-bed reactor (1) for preparing an ethylene homopolymer. The polymerization was carried out in the presence of propane as a polymerization diluent at a temperature of 80° C. and a pressure of 2.5 MPa. Hydrogen was used as the molecular weight regulator. Atmer 163® (a mixture of alkyldiethanolamines of formula R—N(CH$_2$CH$_2$OH)$_2$ where R is an alkyl radical C$_{12}$-C$_{18}$) was used as antistatic agent (AA) and was fed to the fluidized-bed reactor in the ratio to the amount of TIBAL/DEAC mixture dosed to stirred tank (12) as indicated in Table 1, in which further details of the polymerization conditions are shown. The obtained HDPE homopolymer had a melt flow rate $MFR_{2.16}$ of 77 g/10 min. The productivity of the solid catalyst component was 3930 g polymer/g catalyst solid. The polymer particle morphology of the obtained polyethylene powder can be seen in Table 1.

Comparative Example A

The HDPE preparation of Example 1 was repeated, however neither ethylene nor hydrogen were fed to prepolymerization reactor (17). The polymerization conditions are shown in Table 1. The obtained HDPE homopolymer had a melt flow rate $MFR_{2.16}$ of 83 g/10 min. The productivity of the solid catalyst component was 3860 g polymer/g catalyst solid. The polymer particle morphology of the obtained polyethylene powder can be seen in Table 1.

Example 2

The HDPE preparation of Example 1 was repeated, however a catalyst prepared by reacting a magnesium dichloride support with an average particle size $P_{50}$ of 62 μm was used. The solid catalyst component, the mixture of triisobutylaluminum (TIBAL) and diethyl aluminum chloride (DEAC) and tetrahydrofuran (THF) as external electron donor compound were dosed into stirred tank (12) as in Example 1 but the mean residence time of the solid catalyst component in the stirred tank was reduced to 48 minutes. The catalyst suspension discharged from stirred tank (12) was then fed to stirred tank (14) and further reacted therein at 50° C. The mean residence time of the solid catalyst component in the second stirred tank was 147 minutes.

The catalyst suspension discharged from stirred tank (14) was transferred to loop reactor (17) for prepolymerizing with ethylene in the presence of hydrogen as molecular weight regulator. The loop reactor was operated at 60° C. with an average residence time of 25 minutes. The molar ratio of dosed hydrogen to dosed ethylene was 0.2. Ethylene was dosed in an amount that 10 g polymer/g of solid catalyst component were formed. The catalyst suspension discharged from loop reactor (17) was continuously transferred to fluidized-bed reactor (1) for preparing an ethylene homopolymer. The polymerization was carried as in Example 1 however additionally cyclohexyl chloride (CHC) was fed to into the fluidized-bed reactor in the ratio to the amount of solid catalyst component as indicated in Table 1, in which also further details of the polymerization conditions are shown.

The obtained HDPE homopolymer had a melt flow rate $MFR_{2.16}$ of 100 g/10 min. The productivity of the solid catalyst component was 5800 g polymer/g catalyst solid. The polymer particle morphology of the obtained polyethylene powder can be seen in Table 1.

Example 3

The HDPE preparation of Example 2 was repeated with the catalyst of Example 2. The solid catalyst component, the mixture of triisobutylaluminum (TIBAL) and diethyl aluminum chloride (DEAC) and tetrahydrofuran (THF) as external electron donor compound were dosed into stirred tank (12) as in Example 1 but the mean residence time of the solid catalyst component in the stirred tank was 86 minutes and the reaction temperature was 60° C.

The catalyst suspension discharged from stirred tank (12) was then fed to stirred tank (14) in which a first prepolymerization was carried out at 60° C. in the presence of hydrogen as molecular weight regulator with an average residence time in stirred tank (14) of 36 minutes. Ethylene was dosed in an amount that 1 g polymer/g of solid catalyst component were formed. The catalyst suspension discharged from stirred tank (14) was transferred to loop reactor (17) for a second prepolymerization step with ethylene in the presence of hydrogen as molecular weight regulator. The loop reactor was operated at 60° C. with an average residence time of 19 minutes. The molar ratio of dosed hydrogen to dosed ethylene was 0.2. Ethylene was dosed in an amount that 10 g polymer/g of solid catalyst component were formed.

The catalyst suspension discharged from loop reactor (17) was continuously transferred to fluidized-bed reactor (1) for preparing an ethylene homopolymer. The polymerization was carried as in Example 2 with the polymerization conditions as indicated in Table 1. The obtained HDPE homopolymer had a melt flow rate $MFR_{2.16}$ of 82 g/10 min. The productivity of the solid catalyst component was 5930 g polymer/g catalyst solid. The polymer particle morphology of the obtained polyethylene powder can be seen in Table 1.

TABLE 1

| | Example 1 | Comparative Example A | Example 2 | Example 3 |
|---|---|---|---|---|
| AA/alkyl [g/g] | 0.17 | 0.16 | 0.10 | 0.07 |
| CHC/catalyst solid [g/g] | — | — | 0.15 | 0.15 |
| $C_2$ [mol %] | 16.0 | 12.8 | 13.2 | 11.9 |
| $H_2/C_2$ [mol/mol] | 2.3 | 2.5 | 2.2 | 2.7 |
| τ [h] | 3.3 | 3.6 | 2.6 | 2.5 |
| $P_{50}$ [ηm] | 813 | 821 | 1207 | 1232 |
| <500 [wt.-%] | 12.3 | 10.6 | 5.6 | 4.2 |
| <300 [wt.-%] | 3.2 | 3.2 | 2.2 | 1.6 |
| <180 [wt.-%] | 1.1 | 2.0 | 1.0 | 0.7 |
| <125 [wt.-%] | 0.5 | 1.5 | 0.5 | 0.3 |
| <106 [wt.-%] | 0.3 | 0.8 | 0.3 | 0.2 |
| PBD [g/cm³] | 0.483 | 0.451 | 0.487 | 0.476 |

The comparison of Example 1 and Comparative Example A shows that by carrying out a prepolymerization according to the present technology it is possible to drastically reduce the amount of small polymer particles with a diameter <180 µm and to increase the poured bulk density. Simultaneously a slightly higher productivity was achieved. As a result of the lower amounts of fines in Example 1 compared to Comparative Example A, the carry-over of polyethylene particles from the fluidized-bed reactor into the recycle line was decreased and therefore wall sheeting in the recycle line was significantly reduced. Surprisingly, this could be achieved with a very low degree of prepolymerization and without any formation of wall coating in the prepolymerization reactor. Furthermore, Example 2 and 3 show that the polymer morphology can be further improved by operating with two prepolymerization steps in series.

What is claimed is:

1. A process for the gas-phase polymerization of ethylene or a mixture of ethylene and one or more 1-olefins in the presence of a polymerization catalyst system comprising the steps of:
    a) feeding a solid catalyst component obtained by contacting at least a magnesium compound and a titanium compound to a continuously operated apparatus and contacting the solid catalyst component with an aluminum alkyl compound at a temperature of from 0-70° C. such that the mean residence time of the solid catalyst component in contact with the aluminum alkyl compound is from 5 to 300 minutes;
    b) transferring the catalyst component formed in step a) into another continuously operated apparatus and prepolymerizing it with ethylene or a mixture of ethylene and one or more 1-olefins in suspension at a temperature of 10-80° C., forming polymer in an amount of 0.2-25 g polymer/g of solid catalyst component such that the mean residence time of the solid catalyst component in the apparatus is from 5 minutes to 3 hours; and
    c) transferring the prepolymerized catalyst component formed in step b) into a gas-phase polymerization reactor and polymerizing ethylene or a mixture of ethylene and one or more 1-olefins in the presence of the prepolymerized catalyst component at temperatures of 40-120° C. and pressures of 0.1-10 MPa.

2. The process of claim 1, wherein the solid catalyst component was obtained by contacting at least a magnesium compound, a titanium compound; and an internal electron donor compound.

3. The process of claim 2, wherein the internal electron donor compound is a compound selected from the group consisting of alcohols, glycols, esters, ketones, amines, amides, nitriles, alkoxysilanes and aliphatic ethers.

4. The process of claim 1, wherein the contacting of the solid catalyst component with the aluminum alkyl compound is carried out in the presence of an external electron donor compound.

5. The process of claim 4, wherein the external electron donor compound is an aliphatic ether.

6. The process of claim 1, wherein the prepolymerization is carried out in the presence of hydrogen.

7. The process of claim 1, wherein the contacting of the solid catalyst component with an aluminum alkyl compound is carried out in a series of two continuously operated apparatuses and the sum of the mean residence time of the solid catalyst component in contact with the aluminum alkyl compound in the first apparatus for contacting of the solid catalyst component with the aluminum alkyl compound and the mean residence time of the solid catalyst component in contact with the aluminum alkyl compound in the second apparatus for contacting of the solid catalyst component with the aluminum alkyl compound is from 24 to 300 minutes.

8. The process of claim 1, wherein the prepolymerization of the catalyst component formed in step a) is carried out in a series of two continuously operated apparatuses and the sum of the mean residence time of the solid catalyst component in the first apparatus for carrying out the prepolymerization and the mean residence time of the solid catalyst component in the second apparatus for carrying out the prepolymerization is from 30 minutes to 3 hours.

9. The process of claim 1, wherein the apparatus for carrying out the prepolymerization or, if the prepolymerization is carried out in a series of continuously operated apparatuses, the last of the apparatuses for carrying out the prepolymerization is a loop reactor.

10. The process of claim 1, wherein the gas-phase polymerization reactor is a fluidized-bed reactor.

11. The process of claim 10, wherein the fluidized-bed reactor is the first reactor of a series of two or more gas-phase polymerization reactors.

12. The process of claim 1, wherein polymerization is carried out downstream of the fluidized-bed reactor in one or more fluidized-bed reactors or in a multizone circulating reactor, in which the growing polymer particles flow upward through a first polymerization zone under fast fluidization or transport conditions, leave said first polymerization zone and enter a second polymerization zone through which the polymer particles flow downward under the action of gravity, leave said downcomer and are reintroduced into the riser.

* * * * *